United States Patent
Borgarelli et al.

(10) Patent No.: US 11,976,711 B2
(45) Date of Patent: May 7, 2024

(54) LINEAR MECHANICAL SCREW TRANSMISSION

(71) Applicant: UMBRAGROUP S.P.A., Foligno (IT)

(72) Inventors: Nicola Borgarelli, Perugia (IT); Luciano Pizzoni, Foligno (IT)

(73) Assignee: UMBRAGROUP S.P.A., Foligno (IT)

( * ) Notice: Subject to any disclaimer, the term of this patent is extended or adjusted under 35 U.S.C. 154(b) by 17 days.

(21) Appl. No.: 17/762,875

(22) PCT Filed: Sep. 22, 2020

(86) PCT No.: PCT/IB2020/058828
§ 371 (c)(1),
(2) Date: Mar. 23, 2022

(87) PCT Pub. No.: WO2021/069994
PCT Pub. Date: Apr. 15, 2021

(65) Prior Publication Data
US 2022/0356933 A1    Nov. 10, 2022

(30) Foreign Application Priority Data
Oct. 9, 2019 (IT) .................... 102019000018308

(51) Int. Cl.
*F16H 25/22* (2006.01)
*B64C 13/28* (2006.01)
*F16H 25/20* (2006.01)

(52) U.S. Cl.
CPC ......... *F16H 25/2214* (2013.01); *B64C 13/28* (2013.01); *F16H 2025/2075* (2013.01)

(58) Field of Classification Search
CPC ......... F16H 25/2214; F16H 2025/2075; F16H 2025/2204; F16H 2025/2209;
(Continued)

(56) References Cited

U.S. PATENT DOCUMENTS

2015/0295468 A1* 10/2015 Pizzoni .................... H02K 7/06
                                                                       310/80
2017/0248209 A1*  8/2017 Piermarini ............. F16H 25/20
(Continued)

FOREIGN PATENT DOCUMENTS

DE    102005040204 A1    2/2007
DE    102014108231 B3    10/2015
(Continued)

OTHER PUBLICATIONS

International Search Report and Written Opinion dated Apr. 2, 2021 from counterpart International Patent Application No. PCT/IB2020/058828.
(Continued)

*Primary Examiner* — Zakaria Elahmadi
(74) *Attorney, Agent, or Firm* — SHUTTLEWORTH & INGERSOLL, PLC; Timothy J. Klima (57) ABSTRACT

Described is a mechanical transmission (T) comprising a containment structure (1) housing a roto-translational element (2), extending along an axis of rotation (X) and comprising a first and a second threaded portion (3, 4), a rotary element (5) connected or connectable to a drive unit to define a mechanical power input unit and equipped with a first thread (8) designed to engage rotatably with the first threaded portion (3) to the roto-translational element in such a way as to define a first threaded connection, a fixed guide (9) having a second thread (14) designed to engage with the second threaded portion (4) of the roto-translational element (2) in such a way as to define a second threaded connection, and a translating element (10), translating along the axis (X) and defining a power output unit. The translating element (10) is connected to the roto-translational element (2) for translating at the same linear speed as the roto-translational element (2). The roto-translational element (2) is thus simultaneously coupled to the rotary element (5) and to the fixed
(Continued)

guide (9) respectively by means of the first and second threaded connections. These connections have different pitches in such a way as to vary the angular speed between the roto-translational element (2) and the rotary element (5).

19 Claims, 6 Drawing Sheets

(58) Field of Classification Search
CPC ......... F16H 2025/2062; F16H 25/2228; F16H 25/2252; B64C 13/28
See application file for complete search history.

(56) References Cited

U.S. PATENT DOCUMENTS

2020/0186005 A1* 6/2020 Borgarelli ............. B64C 13/505
2022/0356933 A1* 11/2022 Borgarelli ........... F16H 25/2214

FOREIGN PATENT DOCUMENTS

| DE | 102015219031 A1 | 4/2016 |
| EP | 4042039 | 8/2022 |
| WO | 2015081950 A2 | 6/2015 |
| WO | 2021069981 A1 | 4/2021 |

OTHER PUBLICATIONS

European Office Action dated Oct. 24, 2023 from counterpart EP App No. 20781101.9.

* cited by examiner

LINEAR MECHANICAL SCREW TRANSMISSION

This invention relates to a mechanical transmission and is used in particular in the aeronautical field in particular in the control of the surfaces of an aircraft such as, for example, spoiler or flap.

There are prior art linear electro-mechanical actuators comprising an electric motor and a transmission consisting, for example, a screw and a lead nut or a pinion and rack system or alternatively with worm screws.

As is known, the direct-drive actuators, that is, the actuators having the electric motor directly connected to the nut screw, must develop a torque proportional to the pitch of the screw which is higher the higher the axial load is.

Even if a recirculating ball screw is introduced, the greater the load to be supported, the more the diameter of the balls will be increased and therefore the pitch of the screw will be increased. Consequently, the torque required of the motor will also be high, due to the lower speed of rotation of the motor caused by a transmission ratio which cannot be reduced beyond a limit value.

In other words, since the torque required of the motor is proportional to the pitch of the screw, in the presence of large axial loads the motor operates in a condition of large torque and low speed, that is to say, in low efficiency conditions.

Moreover, for high axial loads, the external force is totally discharged on the threads of the nut screw causing high contact pressures which are able to accelerate the wear of the actuator.

As is known, reduction systems are often used to reduce the load required of the motor by means of a gear box or epicyclic gear mechanisms which are interposed between the motor and the nut screw.

Disadvantageously, these transmission systems have some drawbacks in terms of reliability, efficiency and duration.

In effect, the mechanical transmissions are bulky and heavy, adversely affecting the compactness of the actuators, often making their use unsuitable in applications where the weight must be contained, for example in aeronautical applications.

A further drawback derives from the fact that the transmissions formed by a series of gears are not very efficient, especially at low temperatures, and are subject to large wear due to the presence of sliding elements.

Moreover, the use of gear trains also increases the extent of the "backlash", that is to say, the overall clearance between input and output.

With reference to the epicyclic gear mechanisms, on the other hand, they are very expensive and technically complex and their use is often limited.

The technical purpose of the invention is therefore to provide a mechanical transmission which is able to overcome the drawbacks of the prior art.

The aim of the invention is therefore to provide a mechanical transmission which allows the number of components present in the transmission system to be reduced whilst guaranteeing the possibility of implementing a wide range of reduction ratios.

A further aim of the invention is to provide a mechanical transmission which is compact, light and efficient.

A further aim of the invention is to provide a mechanical transmission which has a longer useful life, avoiding sudden friction and excessive loads to the motor and on the screws.

The technical purpose indicated and the aims specified are substantially achieved by a mechanical transmission comprising the technical features described herein. Possible embodiments of the invention are also disclosed herein.

In particular, the technical purpose and the aims specified are achieved by a mechanical transmission comprising: a containment structure, a roto-translational element extending along an axis of rotation and comprising a first threaded portion and a second threaded portion. The roto-translational element is configured to translate along the axis and simultaneously rotate about the axis in such a way as to perform a roto-translational movement.

The mechanical transmission also comprises a rotary element connected or connectable to a drive unit in such a way as to define a mechanical power input unit. The rotary element is equipped with a first thread designed to engage rotatably with the first threaded portion of the roto-translational element. In particular, the roto-translational element and the rotary element are coupled to each other by a lead nut and screw or recirculating ball or roller coupling in such a way as to define a first threaded connection.

The mechanical transmission also comprises a fixed guide forming a part of the containment structure and having a second thread which is able to engage with the second threaded portion of the roto-translational element. Also in this case, a second threaded connection is defined between the roto-translational element and the guide.

The mechanical transmission also comprises a translating element movable along the above-mentioned axis of rotation and defining a power output unit.

In a possible embodiment, the roto-translational motion of the roto-translational element may constitute a power output of the transmission. In effect, if it were necessary to actuate a roto-translational component, such as, for example, in the case (non-limiting) of drilling means, the roto-translational element would act directly as an element for output of the power without the need for the presence of the translating element.

The translating element is connected to the roto-translational element, preferably by means of a circular guide or one or more ball bearings, in such a way as to translate at the same linear speed as the roto-translational element.

The mechanical transmission may also comprise a rotational locking mechanism acting on the translating element in such a way as to lock its rotation about the axis and allow only the translating motion.

In the mechanical transmission, according to the invention, the roto-translational element is therefore simultaneously coupled to the rotary element and to the fixed guide respectively by the first and the second threaded connection. The first and the second threaded connection have different pitches in such a way as to vary the angular speed between the roto-translational element and the rotary element. Preferably, in such a way as to reduce the angular speed of the roto-translational element relative to that of the rotary element.

Further features and advantages of the invention are more apparent in the non-limiting description which follows of a non-exclusive embodiment of a mechanical transmission.

The description is set out below with reference to the accompanying drawings which are provided solely for purposes of illustration without restricting the scope of the invention and in which.

The accompanying drawings illustrate different embodiments of the invention.

Figure 1:
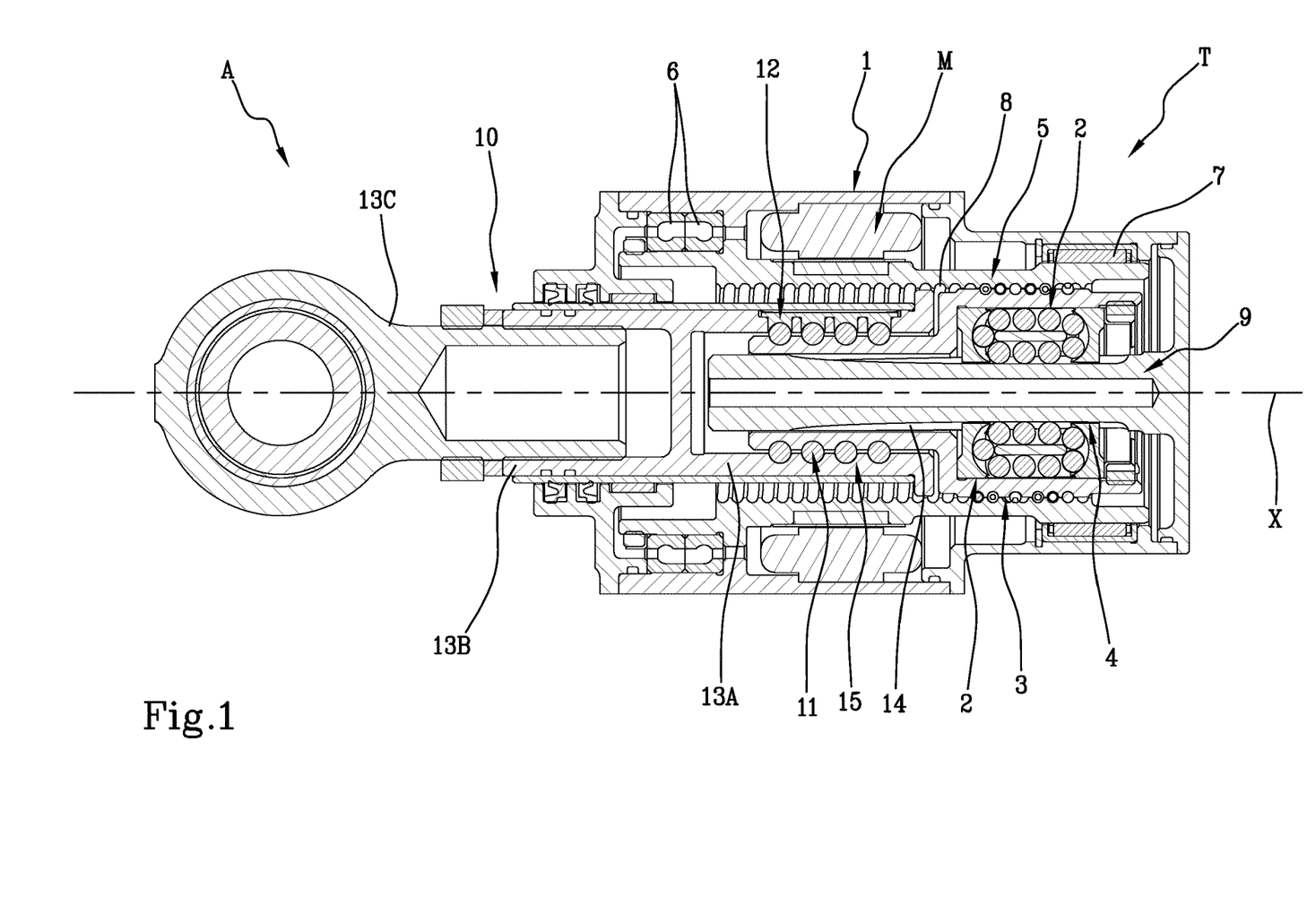
FIG. 1 is a cross-section of a mechanical transmission according to the invention.

FIG. 1 illustrates a linear actuator "A", that is to say, an actuator which is able to convert rotational motion into a linear motion.

The actuator "A" basically comprises an electric motor "M" and a mechanical transmission "T" acting in conjunction with the motor "M" for achieving a very high reduction ratio.

More in detail, the mechanical transmission "T" comprises a containment structure 1, preferably substantially cylindrical in shape, and a roto-translational element 2 extending along an axis of rotation "X".

The roto-translational element 2 is configured to translate along the axis "X" and simultaneously rotate about the axis "X".

The roto-translational element 2 comprises a first threaded portion 3 and a second threaded portion 4.

Figure 2A:
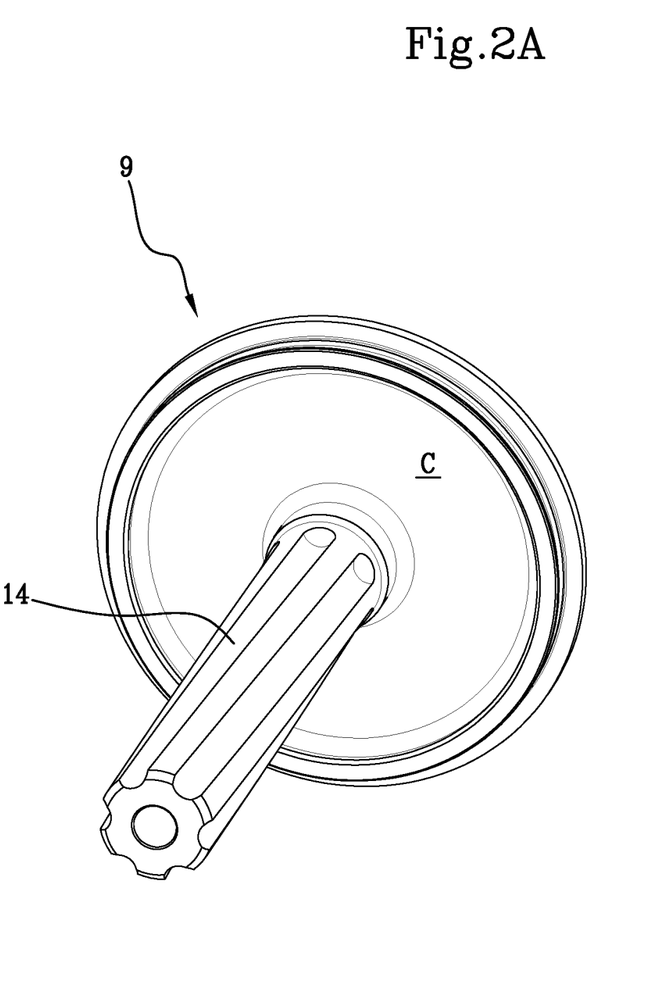
FIGS. 2A and 2B are perspective views of two elements of the mechanical transmission of FIG. 1.
Figure 2B:
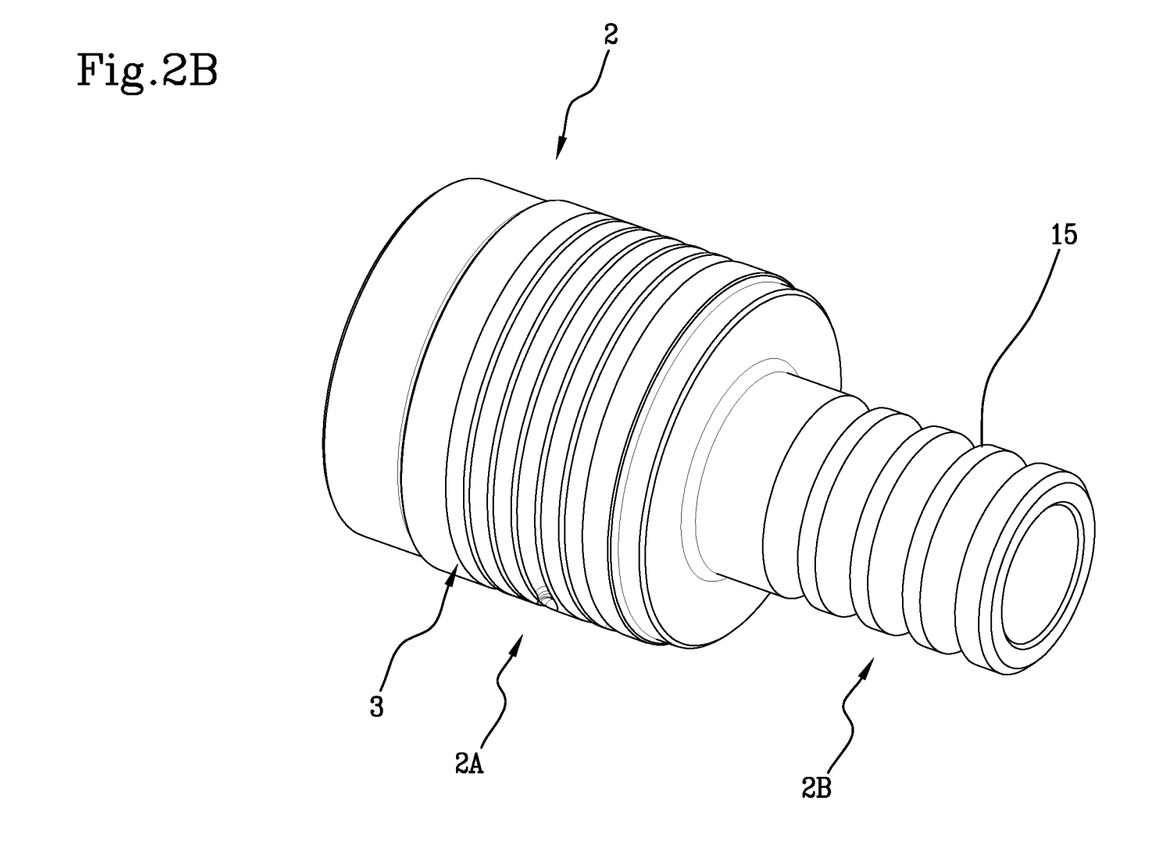

As illustrated in the accompanying drawings, in particular in FIG. 2B, the roto-translational element 2 is made in the form of a hollow body.

More in detail, as illustrated in FIG. 2B, the roto-translational element 2 has a first portion with larger diameter 2A, having the first and the second threaded portion 3, 4, and a second portion with reduced diameter 2B axially spaced from the first portion with larger diameter 2A and having a series of concentric tracks 15.

In another embodiment, not illustrated, the portion with larger diameter 2A may have the concentric tracks 15, whilst the portion with reduced diameter 2B may have the first and the second threaded portion 3, 4.

More generally speaking, the first threaded portion 3, the second threaded portion 4 and the series of concentric tracks 15 can be positioned on the roto-translational element 2 in a different manner depending on the dimensional constraints which it is necessary to comply with.

The mechanical transmission "T" also comprises a rotary element 5 connected or connectable to a drive unit to define a mechanical power input unit. In the embodiment of FIG. 1, the rotary element 5 is made in a hollow form in such a way as to be able to position itself around the roto-translational element 2, more precisely it is made in the form of a mechanical lead nut with a hollow tubular shape and threaded internally.

The rotary element 5 is in effect equipped internally with a first thread 8 designed to engage rotatably with the first threaded portion 3 of the roto-translational element 2 in particular by means of a lead nut and screw or recirculating ball or roller connection in such a way as to define a first threaded connection of the helical type.

Preferably, the first thread 8 has an axial extension greater than that of the first threaded portion 3 in such a way as to define a track along which the roto-translational element 2 can move.

As illustrated in FIG. 1, the rotary element 5 is axially locked thanks to the presence, respectively, of ball bearings 6 and roller bearings 7; this means that the rotary element 5 is mounted inside the mechanical transmission "T" in such a way as to be axially locked and therefore not able to translate along a direction parallel to the axis "X" but only able to perform a rotational movement about the axis "X".

In other words, the rotary element 5 is positioned about the roto-translational element 2 in such a way that the first thread 8 enters rotatably into contact with the first threaded portion 3 of the roto-translational element 2 positioned on the first portion with larger diameter 2A and such as to create the first threaded connection. Preferably, the first threaded connection is of the recirculating ball type wherein the balls are recirculated inside the roto-translational element 2.

The mechanical transmission "T" also comprises a fixed guide 9 forming part of the containment structure 1, in particular the fixed guide 9 extends from a cover "C" for closing the containment structure 1 towards the inside of the mechanical transmission "T".

The fixed guide 9 is made using a fixed body, preferably a pin, axially inserted inside the roto-translational element 2. Preferably, the fixed guide 9 is mounted in cantilever fashion, more preferably integral with the closing lid "C" of the containment body 1.

As illustrated in FIG. 2A, the fixed guide 9 has a second thread 14 designed to engage with the second threaded portion 4 of the roto-translational element 2 in such a way as to define a second threaded connection of the helical type, preferably recirculating ball screw type wherein the balls are recirculated along the roto-translational element 2.

Preferably, the second thread 14 has an axial extension greater than that of the second threaded portion 4 in such a way as to define a track along which the roto-translational element 2 can move.

In this way, the roto-translational element 2 is interposed between the rotary element 5, to which it is rotatably connected by means of the first recirculating ball threaded connection, and the fixed guide 9, to which it is connected by means of the second recirculating ball threaded connection.

Preferably, the pitches of the first and the second threaded connection have a constant value along the entire axial extension of each threaded portion 3, 4.

Preferably, the first and the second threaded connection are positioned on opposite surfaces of the roto-translational element 2. In particular, the first threaded connection is made on an outer surface of the roto-translational element 2 whilst the second threaded connection is made on the inner surface of the roto-translational element 2.

More in detail, the first threaded connection is made on the outer surface of the portion with larger diameter 2A whilst the second threaded connection is made on the inner surface of the first portion with larger diameter 2A.

As shown in FIG. 1, the first and second threaded connections are positioned in a position radially aligned one outside the other. Again from FIG. 1, the first and the second threaded connection have different pitches from each other, in particular of a different module and/or of opposite direction.

The roto-translational element 2 is therefore rotatably connected to the rotary element 5 by means of the first threaded connection defined by the first threaded portion 3 of the roto-translational element 2 and by the first thread 8 of the rotary element 5.

The roto-translational element 2 is also engaged with the fixed guide 9 by means of the second threaded connection, defined by the second threaded portion 4 of the roto-translational element 2 and by the second thread 14 of the fixed guide 9. In this way, the outer surface of the portion with larger diameter 2A of the roto-translational element 2 rotates in contact with the rotary element 5 whilst the inner surface of the portion with larger diameter 2A moves in contact with the fixed guide 9.

In other words, the roto-translational element 2 is interposed between the rotary element 5 and the fixed guide 9 and is simultaneously connected to them respectively by the first and the second threaded connection. Since the first and the second threaded connection have different pitches to each other, in particular of a different module and/or opposite direction, they allow a variation in the angular speed between the roto-translational element 2 and the rotary element 5.

A rotation of the rotary element 5 therefore corresponds to a roto-translation of the roto-translational element 2 the angular speed of which is different from that of the rotary element 5 and a function of the values of the pitches of the first and the second threaded connection.

Advantageously, in order to vary the reduction ratio it is necessary to suitably select a value of the pitches of the first and second threaded connection and, therefore, the value of the pitches of the first and second threaded portions 3, 4 of the roto-translational element 2.

The mechanical transmission "T" also comprises a translating element 10 defining a mechanical power output unit.

The translating element 10 is connected, preferably by means of a circular guide 12 or one or more ball bearings, to the roto-translational element 2 for translating along the axis "X" at the same linear speed as the roto-translational element 2.

Preferably, the translating element 10 is connected to the portion with reduced diameter 2B of the roto-translational element 2 by one or more circumferential rows of balls 11, contained in the guide 12, for achieving a free rotation, and at the same time an axial connection, between the portion with reduced diameter 2B and the translating element 10. Alternatively, the circumferential rows of balls 11 may be replaced by one or more bearings, for example ball or roller bearings.

In other words, the portion with reduced diameter 2B is rotatable relative to the translating element 10 and axially integral with the translating element 10 for translating at the same speed as the translating element 10.

As shown in FIG. 1, the translating element 10 has a cup-shaped portion 13A positioned around, and rotatably coupled to, the second portion with reduced diameter 2B of the roto-translational element 2.

Preferably, the cup-shaped portion 13A has an access opening facing one or more circumferential rows of balls 11 and reclosable by means of a cover defining at least a part of the outer guide 12 for the one or more circumferential rows of balls 11. In this way, the one or more rows of balls 11 can slide along the tracks 15 of the second portion with reduced diameter 2B of the roto-translational element 2 in such a way as to guarantee a connection between the roto-translational element 2 and the translating element 10.

The translating element 10 also has an engagement portion 13B axially integral with the cup-shaped portion 13A and configured for coupling with a mechanical load 13C.

Preferably, the mechanical transmission "T" also comprises a rotational locking mechanism 16 acting on the translating element 10 for locking the rotation of the translating element 10 about the axis "X". The rotational locking mechanism 16 is such that the only translational motion of the roto-translational element 2 is effectively transmitted to the translating element 10 which is therefore translated along the axis "X" with a linear speed equal to that of the roto-translational element 2.

This linear speed is a function of the angular speed of the rotary element 5 and of the values of the pitches of the first and second threaded connections.

In use, the rotary element 5, being connected to the drive unit, acts as a mechanical power input unit in the mechanical transmission "T".

In the embodiment illustrated in FIG. 1, the drive unit is represented by a rotor of an electric motor "M" (for example made by means of permanent magnets) mounted around the rotary element 5.

In another embodiment, not illustrated, the drive unit is represented by a rotor of an electric motor "M" integrated with the rotary element 5.

In a further embodiment, not illustrated, the drive unit is made using a portion shaped radially positioned around the rotary element 5 and designed to act as power pick-up.

Advantageously, the position of the drive unit allows the entire linear actuator "A" to have a small axial dimensions.

The drive unit, whatever its embodiment, rotates the rotary element 5 with a predetermined angular speed. By means of the first threaded connection, the rotary element 5 in turn rotates the roto-translational element 2.

The roto-translational element 2 thus, due to the motion imparted by the rotary element 5, rotates about the axis of rotation "X" but simultaneously also translates along the axis "X" thanks to the presence of the fixed guide 9.

By the combined action of the circular guide 12 and of the locking mechanism 16, only the translating motion of the roto-translational element 2 is transmitted to the translating element 10 which therefore acts as a mechanical power output element.

The mechanical transmission "T" defines inside the actuator "A" two stages: a stage for reducing the motion, and a stage for converting the motion.

In the stage for reducing the motion, the value of the angular speed of the rotary element 5 is varied, as a function of the pitches of the first and the second threaded connections, and then transmitted to the roto-translational element 2.

In the motion conversion stage, on the other hand, the roto-translational motion of the roto-translational element 2 is converted, thanks to the combined action of the guide 12 and the rotational locking mechanism 16, in only translating motion in such a way that the linear speed of the roto-translational element 2 transfers to the translating element 10 which acts in this way as a power output element of the entire mechanical transmission "T".

Advantageously, since the reduction ratio between the angular speed of the first rotary element 5 and that of the translating element 10 depends on the pitches of the first and second thread, in order to obtain a predetermined reduction ratio it is necessary to accurately determine the values of the pitches of the first threaded connection without there being the need to add rotational mechanisms (for example gear wheels to increase the stages) or increase the dimensions of the elements already present in the mechanical transmission "T".

In other words, the possibility of controlling the reduction ratio by means of the pitches of the threads allows a wide range of reduction ratios to be obtained.

By simply introducing the roto-translational element 2 it is therefore possible to cover a wide range of reduction ratios without having to resort to entire chains of kinematic mechanisms. For this reason, the roto-translating element 2 acts both as a motion speed reducer since, thanks to the pitches of the first of the second threaded connection, the angular speed of the motion is varied, and as a motion converter since, thanks to the locking means 16 and the circular guide 12, it transmits only the translating motion to the translating element 10.

Advantageously, the mechanical transmission "T" does not have sliding elements and therefore does not have high wear mechanisms.

Advantageously, the mechanical transmission "T" does not have large dimensions and weights.

Advantageously, depending on requirements, it is therefore possible to reduce the radial dimensions and/or the axial dimensions of the entire linear actuator "A" since, by suitably selecting the values of the pitches of the first and the second threaded connections lying on the roto-translational element 2, it is possible to obtain a large range of reduction ratios.

In the embodiment shown in FIG. 1, the linear actuator "A" has in effect a reduced axial size.

Figure 3:
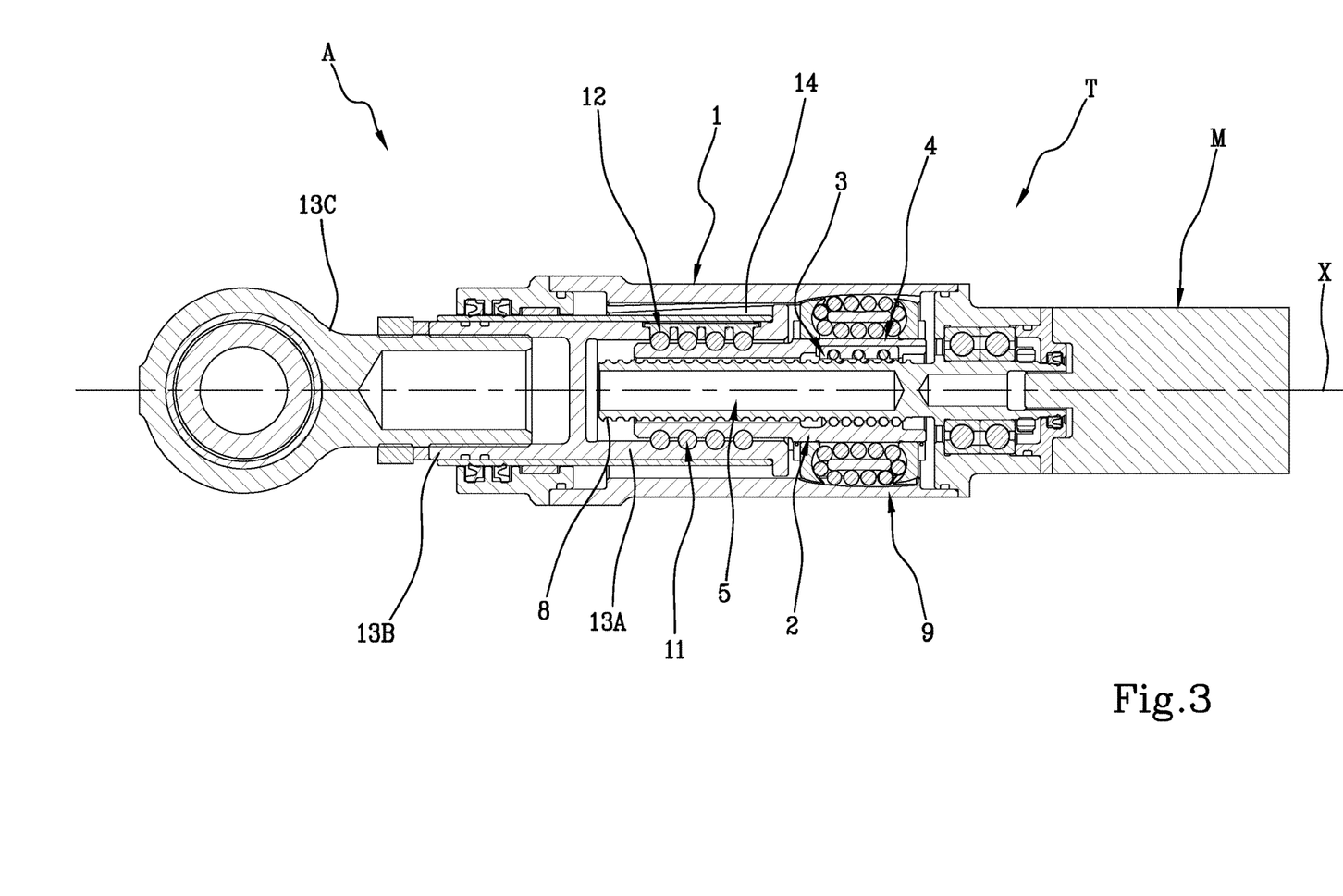
FIG. 3 is a cross-section of a further embodiment of the mechanical transmission.

FIG. 3 shows, on the other hand, a further embodiment of the linear actuator "A", wherein the linear actuator "A" has a reduced radial size.

In particular, in the embodiment of the linear actuator "A" of FIG. 3, the rotary element 5 is made in the form of a shaft rotatable axially inserted inside the roto-translational element 2 whilst the fixed guide 9 is in this case made in the form of a hollow body in such a way as to be positioned outside around the roto-translational element 2.

Also in this case, the roto-translational element 2 is interposed between the fixed guide 9 and the rotary element 5 but, unlike the embodiment illustrated in FIG. 1, the second threaded portion 4 of the roto-translational element 2 is positioned on the outer surface of the portion with larger diameter 2A whilst the first threaded portion 3 is positioned on the inner surface of the portion with larger diameter 2A of the roto-translational element 2.

In the embodiment illustrated in FIG. 3, since the rotary element 5 is made in the form of a rotary shaft inserted inside the roto-translational element, the drive unit "M" is connected to the rotary element 5 in an axial direction. The drive unit "M" is positioned coaxially with the rotary element 5 in such a way that the entire transmission has a smaller radial dimension.

Also in this case, the drive unit may be made, for example, in the form of a rotor of an electric motor integrated or applied to the rotary element 5.

Figure 4:
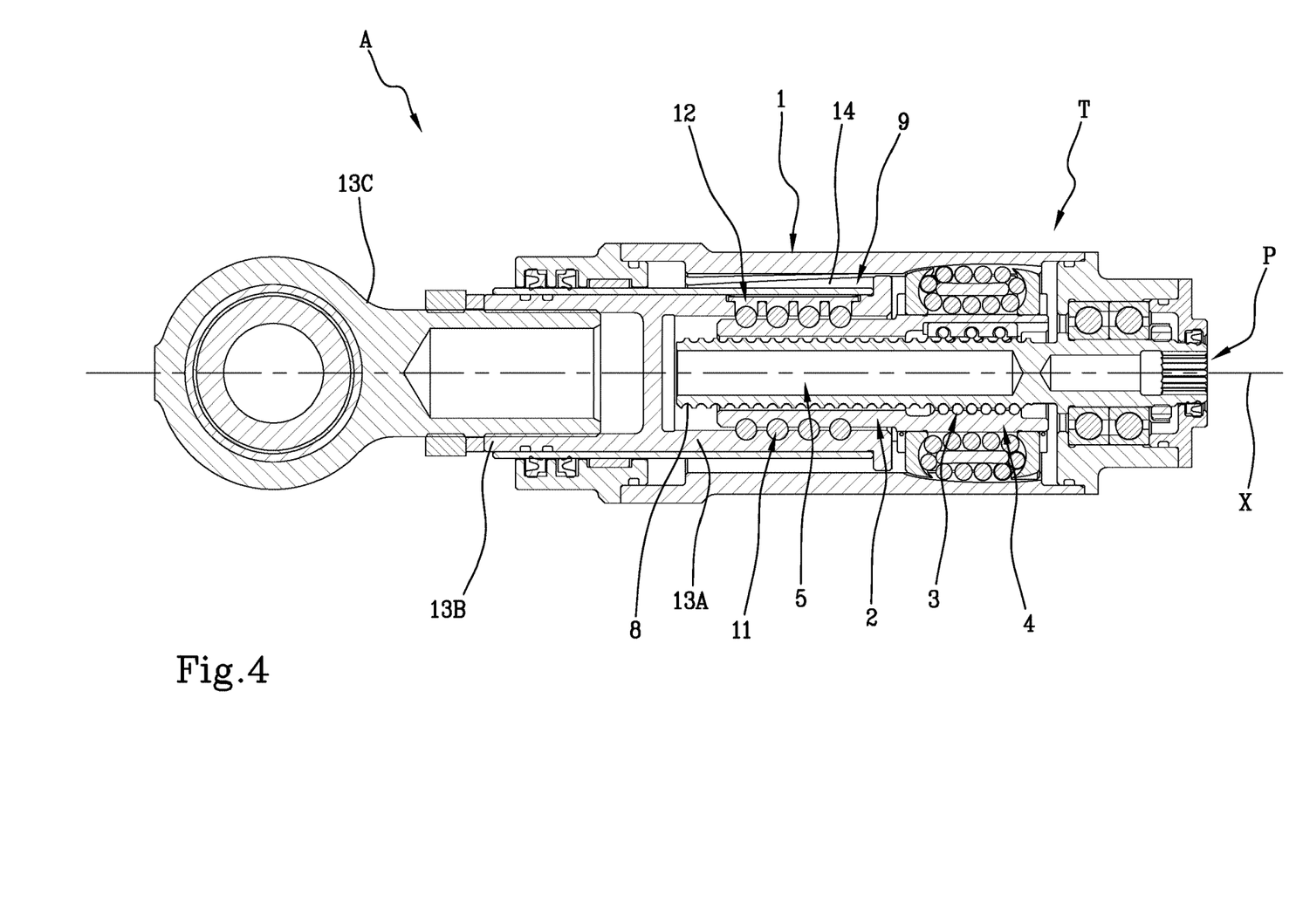
FIG. 4 is a cross-section of a further embodiment of a mechanical transmission.
Figure 5:
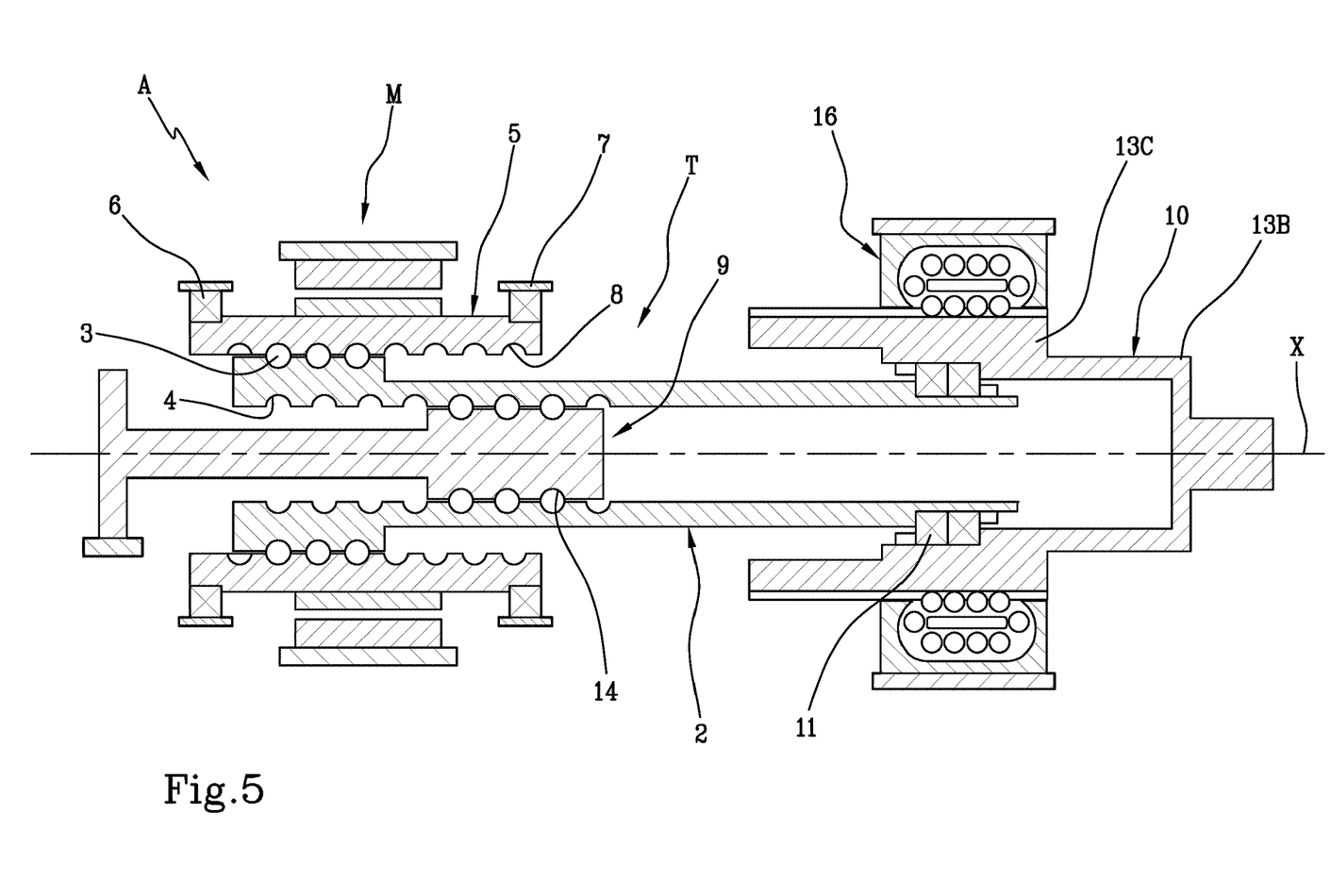
FIG. 5 is a schematic representation of the mechanical transmission according to the invention.

FIG. 4 shows a further embodiment of the linear actuator "A" where the fixed guide 9 and the rotary element 5 are made and positioned as described for the embodiment shown in FIG. 3.

In the case of the embodiment shown in FIG. 4, the rotary element 5 has, however, a grooved end "P" defining a connector for reversible connection to a drive shaft.

This embodiment, too, has reduced radial dimensions.

Preferably, in all the embodiments the threaded connections 3, 8; 4, 14 are made in the form of recirculating ball screws.

More preferably, the first threaded connection 3, 8 is defined by a single recirculating ball screw positioned according to a helical path about the axis of rotation "X", in particular for a winding angle greater than one complete revolution and for example equal to approximately five complete revolutions.

With reference to the second threaded connection 4, 14, on the other hand, it is defined by a plurality of recirculating ball screws independent of each other and angularly distributed relative to each other about the axis of rotation "X". In fact, these recirculating ball screws constituting the second threaded connection 4, 14 lie on surfaces having a very low inclination relative to the axis of rotation "X", due to the very high value of the pitch of the second threaded connection 4, 14.

More in detail, the recirculating ball screws defining the second threaded connection 4, 14 are supported by one or more respective guide blocks 17 rigidly connected to the roto-translational element 2.

With reference to the roto-translational element 2, it is preferably defined by a hollow monolithic body which during the movement along the axis of rotation "X" remains entirely positioned inside the containment structure 1 and which therefore remains confined inside the latter.

In use, the linear actuator "A" described in this way in the various embodiments is used for actuating control surfaces of an aircraft, in particular by directly mounting on a line of action eccentric to a hinge of rotation of the control surfaces.

The invention achieves the above-mentioned aims, eliminating the drawbacks highlighted in the prior art.

In effect, the structure of the mechanical transmission "T" described and claimed in this way allows a wide range of reduction ratios to be obtained without there being the need to increase the overall size and weight of the transmission adding mechanical gear or kinematic mechanisms such as, for example, gear wheels. This advantage makes the mechanical transmission "T" excellent for applications on aircraft.

A further advantage derives from the fact that the mechanical transmission "T" makes it possible to create a reduction ratio such as to reduce the torque required for the drive unit of the linear actuator "A" and increase its speed of rotation without using gear boxes but simply by varying the pitch of the first and the second threaded connection. This results in a greater efficiency and reliability of the entire linear actuator "A".

A further advantage derives from the fact that the mechanical transmission "T" has a smaller "backlash" and a greater rigidity since there are no trains of gear wheels or other long sequences of interconnected elements.

A further advantage derives from the fact that the transmission system, in its normal operation, does not comprise sliding elements. The absence of sliding friction therefore guarantees a greater service life of the mechanical transmission "T".

A further advantage derives from the fact that, thanks to the presence of the fixed guide 9, the external force reacted by the actuator is divided between the fixed guide 9 and the rotary element 5 in such a way as to reduce the contact pressures and therefore increase also in this case the useful life of the actuator. In particular, the force is divided between the fixed guide 9 and the rotary element 5 as a function of the values of the pitches of the first and the second threaded connection.

Advantageously, the system is able to self adjust, thus avoiding excessive contact pressures.

Advantageously, the diameter of the balls of the recirculating ball screw connections, and therefore the pitch of the threaded connections, can be reduced. This results in a further advantage in the reduction of the torque required of the motor. More in detail, thanks to the distribution of the load, the pitches of the threaded connections can be reduced, consequently also the torque requested of the motor is less whilst its speed of rotation is greater.

The invention claimed is:

1. A mechanical transmission comprising:
a containment structure;
a roto-translational element extending along an axis of rotation and comprising a first threaded portion and a second threaded portion, said roto-translational element being configured to translate along said axis and simultaneously rotate about said axis;

a rotary element connected or connectable to a drive unit to define a mechanical power input unit and including a first thread configured to engage rotatably with said first threaded portion of said roto-translational element, via a lead nut and screw or recirculating ball or roller coupling, to define a first threaded connection;

a fixed guide, forming part of said containment structure, having a second thread configured to engage with said second threaded portion of said roto-translational element to define a second threaded connection;

a translating element, translating along said axis and defining a power output unit, said translating element being connected, by a circular guide or one or more ball bearings, to the roto-translational element for translating at a same linear speed as the roto-translational element;

wherein said roto-translational element is simultaneously coupled to the rotary element and to the fixed guide, respectively, by said first and second threaded connections and wherein said first and second threaded connections have different pitches to vary an angular speed between the roto-translational element and the rotary element.

2. The transmission according to claim 1, wherein said roto-translational element is formed as a hollow body and wherein said first and second threaded connections are positioned on opposite surfaces of said roto-translational element, one of said first and second threaded connections being made on an inner surface of the roto-translational element and the other of said first and second threaded connections being positioned on an outer surface of the roto-translational element such that said roto-translational element is positioned between said rotary element and said fixed guide.

3. The transmission according to claim 2, wherein said first and second threaded connections are positioned in a radially aligned position, one outside the other.

4. The transmission according to claim 2, wherein said first thread and said second thread, respectively, of the rotary element and of the fixed guide, have an axial extension greater than an axial extension of the first threaded portion and the second threaded portion of the roto-translational element.

5. The transmission according to claim 2, wherein said roto-translational element has a first portion with a larger diameter having said first and second threaded portions and a second portion with a reduced diameter, axially spaced from the first portion with a larger diameter, said second portion with the reduced diameter being rotatable relative to the translating element and connected in an axially integral manner to the translating element for translating at a same linear speed as the translating element.

6. The transmission according to claim 5, wherein said second portion with the reduced diameter is connected to the translating element by one or more circumferential rows of balls configured for achieving a free rotation, and simultaneously an axial connection, between said second portion with a reduced diameter and the translating element.

7. The transmission according to claim 5, wherein said translating element has a cup-shaped portion positioned about, and rotatably coupled, to said second portion with a reduced diameter of the roto-translational element, and an engaging portion axially integral with the cup-shaped portion and configured for coupling with a mechanical load.

8. The transmission according to claim 3, wherein said fixed guide has a fixed body axially inserted inside the roto-translational element and wherein the rotary element is hollow and positioned around the roto-translational element.

9. The transmission according to claim 3, wherein said rotary element has a rotary shaft axially inserted inside the roto-translational element and wherein said fixed guide is positioned around the roto-translational element, said shaft having a splined terminal defining a connector for reversible connection to a drive shaft.

10. The transmission according to claim 1, wherein said first and second threaded connections are in the form of recirculating ball screws.

11. The transmission according to claim 10, wherein the first threaded connection is defined by a single recirculating ball screw positioned according to a helical path about the axis of rotation and wherein the second threaded connection is defined by a plurality of recirculating ball screws independent of each other and angularly distributed relative to each other about the axis of rotation.

12. The transmission according to claim 11, wherein the recirculating ball screws defining the second threaded connection are supported by one or more respective guide blocks rigidly connected to the roto-translational element.

13. The transmission according to claim 1, wherein said roto-translational element is defined by a hollow monolithic body which during the movement along the axis of rotation remains entirely positioned inside said containment structure.

14. A linear actuator, comprising the transmission according to claim 1, and an electric motor connected to, or integral with, said rotary element.

15. An aircraft comprising the linear actuator according to claim 14 for actuating control surfaces of the aircraft, by directly mounting on a line of action eccentric to a hinge of rotation of said control surfaces.

16. The transmission according to claim 4, wherein said first threaded connection and second threaded connection being made by recirculating balls wherein the balls are recirculated inside the roto-translational element.

17. The transmission according to claim 7, wherein said cup-shaped portion having an access opening facing the one or more circumferential rows of balls and re-closable by a cover defining a part of an outer guide for said one or more circumferential rows of balls.

18. The transmission according to claim 8, wherein said fixed body is mounted in a cantilever fashion, integral, with a cover for closing the containment body.

19. The transmission according to claim 9, wherein said shaft has a splined terminal defining a connector for reversible connection to a drive shaft.

* * * * *